Figure 1:
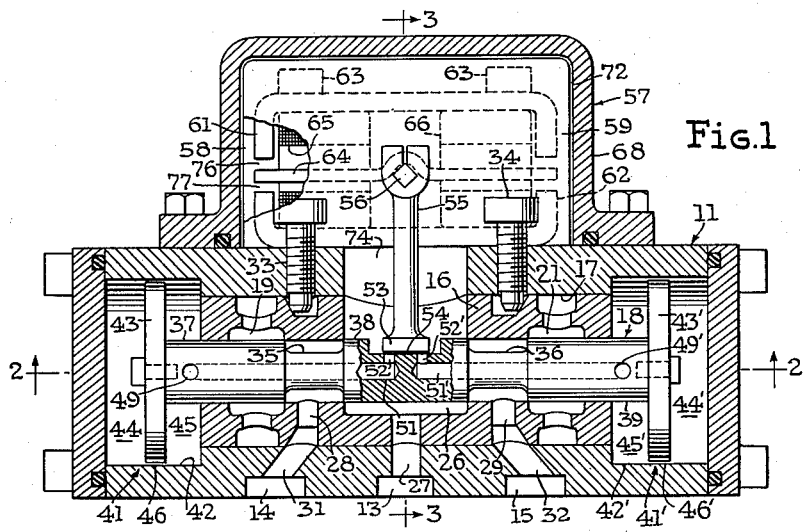

June 2, 1964  M. W. HUBER  3,135,294

SERVO VALVE

Filed April 19, 1962

INVENTOR
Matthew W. Huber

BY Dodge and Sons

ATTORNEYS

United States Patent Office 3,135,294
Patented June 2, 1964

3,135,294
SERVO VALVE
Matthew W. Huber, Watertown, N.Y., assignor to The New York Air Brake Company, a corporation of New Jersey
Filed Apr. 19, 1962, Ser. No. 188,830
2 Claims. (Cl. 137—625.61)

This invention relates to servo valves of the type including an electrical-operated torque motor for actuating a fluid control valve. While the invention is described herein as embodied in an electro-hydraulic servo valve, it will be understood that it can also be used in electro-pneumatic servo valves.

A typical device of this type is the two-stage electro-hydraulic valve used to control a double-acting motor. This device includes a first stage valve having a pair of ports that discharge to an exhaust chamber and a movable element that is actuated by the torque motor and varies in reverse senses the restrictions to flow through the two ports. The second stage unit usually is a four-way spool type valve having supply and exhaust passages and a pair of outlet passages that are connected with the opposite sides of the double-acting motor that is being controlled. The second stage valve is shiftable in opposite directions from a null position to selectively connect each outlet pasage with the supply and exhaust passages while connecting the other outlet passage with the exhaust and supply passages, respectively, by a pair of opposed fluid pressure motors. Each of these motors is connected with one port of the first stage valve and with the supply passage. The latter connection includes a metering orifice and, therefore, the variations in the flow restrictions at the ports of the first stage unit produce pressure changes in the opposed motors that cause them to shift the second stage valve in its opposite directions of motion.

These valves are extremely delicate and malfunctions attributable to foreign matter carried in the fluid being handled are not uncommon. One trouble spot is the metering orifice located in the connection between each motor of the second stage and the supply passage. In the conventional valve these orifices are usually circular openings of very small diameter and clog easily. Obviously, changes in the cross-sectional area of the orifice resulting from the accumulation of foreign matter adversely affects the performance of the valve, and complete closure of the orifice renders the valve useless.

Another trouble spot is the torque motor. Originally, valves of this kind employed "wet" torque motors in which the moving parts of the motor were freely subjected to the motive fluid. This scheme is satisfactory for a time, but, even with the best filtration, foreign matter, particularly ferromagnetic particles, accumulates on the pole pieces and limits or completely prevents movement of the motor armature. As a result of this difficulty, the "dry" torque motor was developed. In this device, motion of the armature is transmitted to the first stage valve through a flexible member or diaphragm that isolates the moving parts of the motor from the fluid-containing portions of the valve. While these flexible members do prevent contamination of the motor, they are delicate and expensive and often are fractured by mechanical vibrations and pressure surges. Furthermore, these members frequently warp as a result of temperature changes and produce a shift in the null point of the valve.

The object of this invention is to provide a servo valve in which the likelihood of malfunction due to contaminants in the fluid is reduced in an inexpensive and reliable manner. According to one aspect of the invention, the second stage valve is actuated by a pair of opposed double-acting piston motors in each of which the piston is spaced radially from its cylinder bore to define an annular restricted passage that interconnects the opposed working chambers. One working chamber of each motor is connected with the supply passage and the other chamber of each motor is connected with one port of the first stage valve. Therefore, this restricted passage corresponds to the metering orifice in the prior art valves. Since the passage is of annular shape, it is less susceptible to clogging by contaminants in the fluid than the conventional orifice.

According to another aspect of the invention, the torque motor employed in the servo valve is of the "stagnant" type, i.e., it is in communication with fluid-containing portions of the valve but fluid is not circulated freely through it. The flow passage through which fluid may pass into and out of the torque motor is narrow and is defined, at least in part, by a magnetic field-generating portion of the torque motor. With this arrangement, a part of the torque motor also functions as a magnetic filter and prevents ferromagnetic particles from entering the motor. This scheme does not add appreciably to the cost of the valve and, since the fluid does not circulate freely through the motor, effective filtration is realized over rather long periods of operation.

Figure 2:
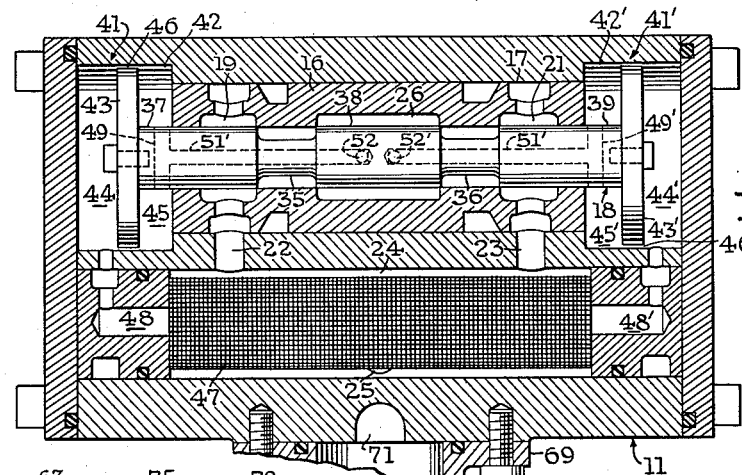
Figure 3:
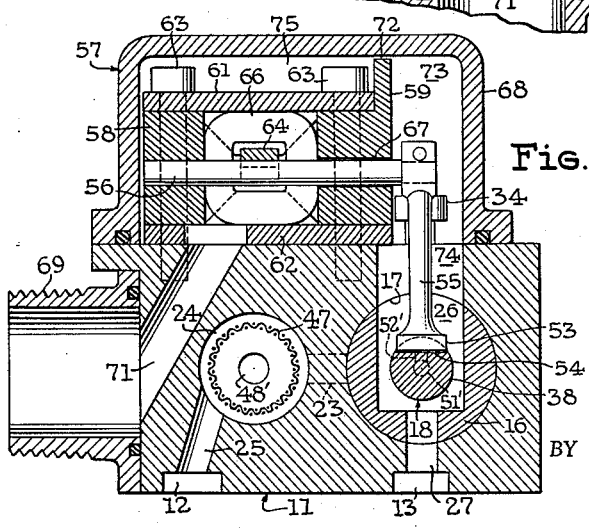

The preferred embodiment of the invention is described herein in connection with the accompanying drawing in which:

FIG. 1 is a sectional view of the servo valve.
FIG. 2 is a sectional view taken in line 2—2 of FIG. 1.
FIG. 3 is a sectional view taken on line 3—3 of FIG. 1.

Referring to the drawing, the servo valve comprises a housing 11 containing inlet and exhaust ports 12 and 13, respectively, and a pair of outlet ports 14 and 15. Flow to and from the outlet ports 14 and 15 is controlled by a second stage valve unit comprising a valve sleeve 16 mounted in through bore 17 and containing a sliding valve spool 18. Valve sleeve 16 contains a pair of annular supply chambers 19 and 21 that are connected with inlet port 12 through passages 22 and 23, respectively, filter chamber 24, and passage 25, a central exhaust chamber 26 that is connected with exhaust port 13 through passage 27, and a pair of radial outlet passages 28 and 29 which are connected with outlet ports 14 and 15 respectively, by passages 31 and 32. The longitudinal position of sleeve 16 relative to bore 17 is adjusted and maintained by a pair of set screws 33 and 34 having tapered ends that engage inclined surfaces on the sleeve.

Valve spool 18 is formed with two annular grooves 35 and 36 that define three spaced valve lands 37–39 so arranged that, in the illustrated null position, lands 37 and 38 isolate outlet passage 28 and lands 38 and 39 isolate outlet passage 29. When valve spool 18 is shifted to the right from the null position, groove 36 interconnects outlet passage 29 and supply chamber 21 and groove 35 interconnects outlet passage 28 and exhaust chamber 26, and when the spool is shifted to the left from the null position groove 35 interconnects outlet passage 28 and supply chamber 19 and groove 36 interconnects outlet passage 29 and exhaust chamber 26.

Valve spool 18 is moved in opposite directions from the null position by a pair of double-acting piston motors 41 and 41'. Motor 41 comprises a cylinder bore 42 defined by an enlarged portion of bore 17, and a piston 43 defined by an enlarged flange that is attached to the end of valve spool 18 and divides cylinder bore 42 into opposed working chambers 44 and 45. The outside diameter of piston 43 is about .001 to .002 inch less than the diameter of bore 42 in order to define an annular restricted passage 46 that interconnects the two working chambers. Fluid is delivered to working chamber 44 from inlet port 12 through passage 25, filter chamber 24, filter 47 and passage 48, and fluid is exhausted from working chamber 45 through radial passages 49, axial passage 51 and radial port 52 formed in valve spool 18. Double-acting motor 41' is identical to motor 41 so its counterparts are designated by the same reference numerals with primes added for clarity.

Motors 41 and 41' are under the control of a first stage valve comprising radial ports 52 and 52' and a valve plate 53 which is spaced slightly from the flat 54 formed in land 38 of valve spool 18 and which is carried by an arm 55 fixed to the armature shaft 56 of torque motor 57. The torque motor comprises a pair of permanent magnets 58 and 59 and channel shaped pole plates 61 and 62 which are clamped together and to housing 11 by four bolts 63, an armature 64 that is fixed to shaft 56, and a pair of coils 65 and 66 that encircle the armature on opposite sides of shaft 56. Armature shaft 56 passes freely through a bore 67 formed in magnet 59 but is pressed into an aligned bore in magnet 58. Therefore, shaft 56 serves as a torsion spring for stabilizing armature 64. The electric leads (not shown) for coils 65 and 66 are led into the torque motor through connector 69 and passage 71.

It will be observed in FIGS. 1 and 3 that magnet 59 is spaced from the inner surface of the cover 68 of torque motor 57 to define a narrow passage 72, and that the space 73 in the cover communicates with exhaust chamber 26 through passage 74. Thus, while the fluid handled by the servo valve is not forced through the torque motor, it is free to move into space 73 and thence through passage 72 and the radial clearance between bore 67 and armature shaft 56 into the interior 75 of the torque motor. Since this passage and clearance space are quite narrow and are defined in part by a magnet, any magnetic particles suspended in the fluid flowing into the interior 75 of the torque motor will be attracted to and held on the magnet 59 and prevented from entering the torque motor. As a result, deposition of magnetic particles on the pole pieces in the regions 76 and 77 between these pieces and the armature is prevented.

In use, inlet port 12 is connected with a pump, exhaust port 13 is connected with a sump, and outlet ports 14 and 15 are connected with the opposite sides of the double-acting motor which it is desired to control. The fluid entering inlet port 12 flows along parallel flow paths to the first stage valve; one path comprising passage 25, filter chamber 24, filter 47, passage 48, working chamber 44, annular passage 46, working chamber 45, passages 49 and 51 and port 52, and the other path comprising passage 25, filter chamber 24, filter 47, passage 48', working chamber 44', annular passage 46', working chamber 45', passages 49' and 51', and port 52'. When the currents passing through the coils 65 and 66 of the torque motor are balanced, armature 64 assumes the position shown in the drawing thereby causing plate valve 53 to restrict the flows from ports 52 and 52' equal amounts. Therefore, in this null condition of the valve, the pressures in working chambers 44 and 44' are equal and the pressures in working chambers 45 and 45' are equal. As a result, valve spool 18 is maintained in the illustrated position in which lands 37 and 39 isolate outlet ports 14 and 15, respectively, from both the inlet port 12 and the exhaust port 13.

When the currents through the coils 65 and 66 are unbalanced in the sense that produces clockwise movement of armature 64, plate valve 53 increases the restriction to flow through port 52 and decreases the restriction to flow through port 52'. Since the flows to working chambers 45 and 45' pass through the restricted annular passage 46 and 46', respectively, this action decreases the pressure in chamber 45' relative to the pressure in chamber 45 and causes motors 41 and 41' to shift valve spool 18 to the left as viewed in FIG. 1. This movement of spool 18 is accompanied by follow up action at the first stage valve and the spool comes to rest when the restrictions to flow through ports 52 and 52' are again equal. In this new position of spool 18, annular groove 35 interconnects supply chamber 19 and passage 28 and groove 36 interconnects exhaust chamber 26 and passage 29, so outlet port 14 receives fluid under pressure and outlet port 15 is vented to reservoir. As a result, the double-acting motor connected with the outlet ports is moved in one of its two directions of motion.

When the currents passing through coils 65 and 66 are rebalanced, the torsional elasticity of armature shaft 56 returns armature 64 and plate valve 53 to their illustrated null positions. Since, at this instant, spool 18 is in a position to the left of the null position, this movement of plate valve 53 has the effect of increasing the restriction at port 52' relative to the restriction at port 52 and, therefore, of raising the pressure in working chamber 45' relatively to the pressure in working chamber 45. Valve spool 18 now moves to the right, and, because of the follow-up action at the first stage valve, comes to rest in the illustrated null position in which outlet ports 14 and 15 are isolated from the inlet and exhaust ports 12 and 13.

Unbalancing of the currents passing through coils 65 and 66 in the opposite direction produces counterclockwise movement of armature 64 and plate valve 53. In this case, the resulting pressure differential between working chambers 45 and 45' produces rightward movement of spool 18 from the null position thereby causing it to supply fluid under pressure to outlet port 15 and to vent outlet port 14. As a result, the motor being controlled moves in the opposite direction. Movement of this motor is interrupted, and the ports of the valve are returned to their illustrated null positions when the currents passing through coils 65 and 66 are rebalanced.

In many prior valves, the pistons of the motors that operate the second stage valve are the opposite ends of the valve spool. Since the diameter of the spool usually is quite small, this arrangement requires rather high operating pressures. In contrast to this, the pistons 43 and 43' of the preferred embodiment have effective areas several times as large as the cross-sectional area of the spool 18 and, therefore, shifting of the spool takes place at much lower pressure levels.

In the construction described above, the likelihood of malfunction due to deposition of contaminants at the two trouble spots mentioned earlier is minimized. The torque motor 57 is immersed in the fluid being handled, but the fluid is not circulated through it and the fluid exchange paths (i.e., passage 72 and the clearance between armature shaft 56 and bore 67) are narrow and are partially defined by permanent magnet 59. Therefore, ferromagnetic particles in the fluid in chamber 73 are not carried into the interior 75 of the torque motor when fluid exchange takes place but are attracted to and held on the magnet 59. The restricted passages 46 and 46', which function as the metering orifices for the spool actuating motors, are annular and, therefore, can have rather narrow widths without risk of clogging by contaminants that are not trapped by filter 47. Furthermore, with this type of metering orifice, it is possible to compensate for variations in fluid viscosity resulting from temperature changes. This can be done by so selecting the materials used in flanges 43 and 43' and in housing 11 that the differential expansion of these parts produced by a change in temperature varies the width of the annular passages 46 and 46' an amount that offsets the effect of a change in fluid viscosity.

As stated previously, the drawing and description relate only to the preferred embodiment of the invention. Since changes can be made in the structure of this embodiment without departing from the inventive concept, the following claims should provide the sole measure of the scope of the invention.

What I claim is:
1. A servo valve comprising
   (a) a first stage valve having an exhaust chamber, a pair of ports leading into the chamber and an element movable in opposite directions from a null position to vary in reverse senses the flow restriction afforded by the two ports;
   (b) a torque motor of the stagnant type for shifting the movable element of the first stage valve in said opposite directions, said torque motor having an internal region containing an armature and at least one cooperating pole piece;
   (c) a second stage valve having a supply passage, an exhaust passage, at least one outlet passage, and a movable member shiftable in opposite directions from a null position to control communications between the outlet passage and the supply and exhaust passages;
   (d) a pair of opposed double-acting piston motors connected with the movable member of the second stage valve for shifting it in said opposite directions, each motor comprising a cylinder bore and a piston reciprocable in the cylinder bore and dividing it into opposed working chambers, the outer periphery of the piston being spaced radially from the inner periphery of the cylinder bore to define an annular restricted passage that interconnects said opposed working chambers;
   (e) means for supplying fluid under pressure to one working chamber of each motor so that the motors exert oppositely directed shifting forces on the movable member of the second stage valve;
   (f) flow passages connecting each of the other working chambers with one of the ports of the first stage valve; and
   (g) means defining a fluid exchange passage connecting said internal region of the torque motor with a fluid-containing space of the servo valve and including a narrow passage portion defined at least in part by a magnetic field-generating portion of the torque motor.

2. In a servo valve of the type including an electrically operated torque motor of the stagnant type for actuating a fluid control valve and having an internal region containing an armature and at least one cooperating pole piece, the improvement which comprises means defining a fluid exchange passage connecting said internal region of the torque motor with a fluid-containing portion of the servo valve and including a narrow passage portion defined at least in part by a magnetic field-generating portion of the torque motor.

References Cited in the file of this patent

UNITED STATES PATENTS

| | | |
|---|---|---|
| 2,655,939 | Tauscher | Oct. 20, 1953 |
| 2,655,940 | Jackson | Oct. 20, 1953 |
| 2,709,421 | Avery | May 31, 1955 |
| 2,767,689 | Moog | Oct. 23, 1956 |
| 2,879,467 | Stern | Mar. 24, 1959 |
| 2,933,106 | Gerwig et al. | Apr. 19, 1960 |
| 2,936,783 | Maffatt | May 17, 1960 |
| 2,964,018 | Farron | Dec. 13, 1960 |
| 3,003,476 | Thomas | Oct. 10, 1961 |
| 3,028,880 | Reitman | Apr. 10, 1962 |
| 3,065,145 | Molander | Nov. 20, 1962 |

FOREIGN PATENTS

| | | |
|---|---|---|
| 1,124,317 | Germany | Feb. 22, 1962 |